Patented Mar. 9, 1948

2,437,277

UNITED STATES PATENT OFFICE 2,437,277

PROCESS FOR THE PRODUCTION OF ERYTHRITOL

Frank J. Soday, Baton Rouge, La., assignor to The United Gas Improvement Company, a corporation of Pennsylvania No Drawing. Application February 2, 1944, Serial No. 520,826

1 Claim. (Cl. 260—636)

This invention pertains to the preparation of butadiene tetrol, and is based upon the discovery that butadiene tetrol may be prepared in good yield by the hydrolysis of one or more tetra-substituted butanes possessing groups capable of being replaced with hydroxyl groups.

More particularly, this invention is concerned with the preparation of butadiene tetrol, or erythritol, by the hydrolysis of butadiene dihalodiesters.

The preparation of dihalodiesters of butadiene is described and claimed in my copending application Serial No. 521,127, filed February 4, 1944.

Dihalodiesters of butadiene are formed when butadiene is contacted with aqueous solutions of hypohalous acid and a concentrated organic acid for example at normal or reduced temperatures. Conditions which promote intimate contact of the phases accelerate the formation of the desired dihalodiester, or in other words the desired organic acid diester of dihalobutadiene.

I have discovered that butadiene dihalodiesters, and particularly butadiene dichlorodiacetate, may be converted to butadiene tetrol, or erythritol, by hydrolysis in the presence of mild alkalies, such as alkali and alkaline earth carbonates or bicarbonates; alkali formates such as sodium formate; and/or alkali or alkaline earth acetates, oxalates, or phosphates.

Butadiene dihalodiesters preferably are hydrolyzed in the presence of one or more weak alkalies, such as the alkali or alkaline earth carbonates or bicarbonates. Excellent results are obtained when such hydrolysis is carried out in the presence of a 5–25% aqueous solution of such alkalies, using temperatures in the range of 100–160° C. and more preferably in the range of 110–140° C.

After hydrolysis, the butadiene tetrol, or erythritol, may be isolated from the hydrolyzing solution by any desired method, such as by selective solvent action, fractionation under greatly reduced pressure, or otherwise.

The invention may be illustrated by the following example.

Example 1

Two mols of butadiene dichloro diacetate is hydrolyzed by a 10% aqueous solution of sodium bicarbonate by heating to a temperature of 125° C. for a period of 10 hours. An excellent yield of Meso erythritol is obtained.

In the specification and the claims, the term "weak alkali" is intended to mean alkaline agents other than the oxides or hydroxides of the alkali or alkaline earth metals.

It will be further understood that the foregoing is by way of disclosure and that changes, omissions, additions, substitutions, and/or modifications might be made within the scope of the claim without departing from the spirit of the invention.

I claim:

A process for the preparation of erythritol which comprises hydrolyzing a dichloro diacetate of butadiene in the presence of a 5 to 25% aqueous solution of a weak alkali at a temperature in the range of from 110° to 140° C.

FRANK J. SODAY.

REFERENCES CITED

The following references are of record in the file of this patent:

UNITED STATES PATENTS

| Number | Name | Date |
|---|---|---|
| 2,181,297 | Britton et al. | Nov. 28, 1939 |

FOREIGN PATENTS

| Number | Country | Date |
|---|---|---|
| 512,182 | Great Britain | Aug. 30, 1939 |
| 309,111 | Germany | Jan. 18, 1921 |